(12) United States Patent
Hiyama et al.

(10) Patent No.: US 8,598,901 B2
(45) Date of Patent: Dec. 3, 2013

(54) PHOTOELECTRIC CONVERSION SYSTEM

(71) Applicant: Canon Kabushiki Kaisha, Tokyo (JP)

(72) Inventors: Hiroki Hiyama, Sagamihara (JP);
Tetsuya Itano, Sagamihara (JP);
Kazuhiro Saito, Tokyo (JP); Yu Maehashi, Kawasaki (JP); Koichiro Iwata, Kawasaki (JP); Kohichi Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/624,183

(22) Filed: Sep. 21, 2012

(65) Prior Publication Data

US 2013/0089320 A1 Apr. 11, 2013

(30) Foreign Application Priority Data

Oct. 7, 2011 (JP) ................................. 2011-223330

(51) Int. Cl.
*G01R 31/3187* (2006.01)
*H04N 5/335* (2011.01)

(52) U.S. Cl.
USPC ....................................... 324/750.3; 348/297

(58) Field of Classification Search
USPC ....................................... 348/297; 324/750.3
See application file for complete search history.

(56) References Cited

U.S. PATENT DOCUMENTS

| 5,532,765 | A  | * | 7/1996  | Inoue et al. ................... 348/807 |
| 6,188,094 | B1 |   | 2/2001  | Kochi et al. ................... 257/232 |
| 6,633,335 | B1 |   | 10/2003 | Kwon et al. |
| 6,670,990 | B1 |   | 12/2003 | Kochi et al. ................... 348/310 |
| 6,960,751 | B2 |   | 11/2005 | Hiyama et al. ............. 250/208.1 |
| 7,110,030 | B1 |   | 9/2006  | Kochi et al. ................... 348/308 |
| 7,126,102 | B2 |   | 10/2006 | Inoue et al. ................... 250/214 |
| 7,187,052 | B2 |   | 3/2007  | Okita et al. ................... 257/444 |
| 7,283,305 | B2 |   | 10/2007 | Okita et al. ................... 359/619 |
| 7,321,110 | B2 |   | 1/2008  | Okita et al. ............... 250/208.1 |
| 7,408,210 | B2 |   | 8/2008  | Ogura et al. .................. 257/233 |
| 7,429,764 | B2 |   | 9/2008  | Koizumi et al. ............. 257/292 |
| 7,460,162 | B2 |   | 12/2008 | Koizumi et al. ............. 348/294 |
| 7,462,810 | B2 |   | 12/2008 | Kobayashi et al. ........ 250/208.1 |
| 7,528,878 | B2 |   | 5/2009  | Sato et al. .................... 348/317 |

(Continued)

FOREIGN PATENT DOCUMENTS

JP            11-331883   A      11/1999

OTHER PUBLICATIONS

U.S. Appl. No. 13/540,285, filed, Jul. 2, 2012.
U.S. Appl. No. 13/585,029, filed Aug. 14, 2012.

(Continued)

*Primary Examiner* — Evan Pert
(74) *Attorney, Agent, or Firm* — Fitzpatrick, Cella, Harper & Scinto

(57) ABSTRACT

A system includes: a plurality of pixels arranged in a matrix; a reference signal generating unit for generating a ramp signal; A/D converters each arranged correspondingly to each of columns to A/D-convert a signal from the pixel; a counter that performs a count operation according to an output of the ramp signal, and supplies the count signal through the count signal line to the A/D converter; and a counter test circuit that is provided independently from the A/D converter, and tests the counter, based on a matching of the expected value of the count signal with the count signal supplied through the count signal line from the counter. This configuration allows the count signal to be checked concurrently with imaging of an object.

9 Claims, 11 Drawing Sheets

(56) References Cited

U.S. PATENT DOCUMENTS

| | | | |
|---|---|---|---|
| 7,531,885 B2 | 5/2009 | Okita et al. | 257/444 |
| 7,538,804 B2 | 5/2009 | Okita et al. | 348/241 |
| 7,550,793 B2 | 6/2009 | Itano et al. | 257/239 |
| 7,592,579 B2 | 9/2009 | Tamura et al. | 250/208.1 |
| 7,638,826 B2 | 12/2009 | Hiyama et al. | 257/291 |
| 7,719,587 B2 | 5/2010 | Ogura et al. | 348/302 |
| 7,741,593 B2 | 6/2010 | Iwata et al. | 250/214 |
| 7,755,688 B2 | 7/2010 | Hatano et al. | 348/300 |
| 7,812,873 B2 | 10/2010 | Hiyama et al. | 348/294 |
| 7,812,876 B2 | 10/2010 | Hiyama et al. | 348/300 |
| 7,825,974 B2 | 11/2010 | Itano et al. | 348/308 |
| 7,920,192 B2 | 4/2011 | Watanabe et al. | 348/308 |
| 7,982,789 B2 | 7/2011 | Watanabe et al. | 348/308 |
| 8,013,369 B2 | 9/2011 | Iwata et al. | 257/290 |
| 8,023,025 B2 | 9/2011 | Itano et al. | 348/308 |
| 8,040,269 B2 * | 10/2011 | Bogaerts | 341/169 |
| 8,045,034 B2 | 10/2011 | Shibata et al. | 348/308 |
| 8,081,245 B2 | 12/2011 | Itano et al. | 348/301 |
| 8,085,319 B2 | 12/2011 | Ono et al. | 348/241 |
| 8,106,955 B2 | 1/2012 | Okita et al. | 348/220.1 |
| 8,120,686 B2 | 2/2012 | Hatano et al. | 348/308 |
| 8,159,577 B2 | 4/2012 | Iwata et al. | 348/296 |
| 8,208,055 B2 | 6/2012 | Hiyama | 348/300 |
| 8,218,050 B2 | 7/2012 | Ogura et al. | 348/308 |
| 8,289,431 B2 | 10/2012 | Itano | 348/308 |
| 8,325,260 B2 | 12/2012 | Yamazaki et al. | 348/308 |
| 8,363,137 B2 | 1/2013 | Sonoda et al. | 348/302 |
| 2008/0259185 A1 * | 10/2008 | Mouli | 348/231.99 |
| 2009/0219424 A1 | 9/2009 | Sonoda et al. | 348/302 |
| 2009/0322922 A1 | 12/2009 | Saito et al. | 348/308 |
| 2010/0060762 A1 | 3/2010 | Takada et al. | 348/300 |
| 2010/0201856 A1 | 8/2010 | Hayashi et al. | 348/296 |
| 2010/0295978 A1 | 11/2010 | Nakamura et al. | 348/273 |
| 2011/0115663 A1 * | 5/2011 | Bogaerts | 341/164 |
| 2012/0026371 A1 | 2/2012 | Itano et al. | 348/301 |

OTHER PUBLICATIONS

U.S. Appl. No. 13/586,956, filed Aug. 16, 2012.
U.S. Appl. No. 13/591,903, filed Aug. 22, 2012.
U.S. Appl. No. 13/611,476, filed Sep. 12, 2012.
U.S. Appl. No. 13/614,121, filed Sep. 13, 2012.
U.S. Appl. No. 13/644,773, filed Oct. 4, 2012.

* cited by examiner

| INPUT CLOCK | EXPECTED VALUE | | |
|---|---|---|---|
| | EVAL[0,CK] | EVAL[1,CK] | EVAL[2,CK] |
| CNT[1] | 1 | – | – |
| CNT[2] | 0 | 1 | – |
| CNT[3] | 0 | 0 | 1 |

PHOTOELECTRIC CONVERSION SYSTEM

BACKGROUND OF THE INVENTION

1. Field of the Invention

The present invention relates to a photoelectric conversion system.

2. Description of the Related Art

Among photoelectric conversion devices, such as an image sensor, that include an analog-to-digital converter (A/D converter), there has been proposed a type that further includes a diagnosis circuit for the A/D converter. According to Japanese Patent Application Laid-Open No. H11-331883, a checking signal is input instead of a pixel signal, a count signal is thus written at any time into a latch (column memory) provided for each column and then read the signal so as to perform diagnosis.

SUMMARY OF THE INVENTION

Unfortunately, the diagnosis circuit of the image sensor disclosed in Japanese Patent Application Laid-Open No. H11-331883 has a following problem. In the case of verifying the linearity of a count signal to be supplied to the A/D converter, the count signal should be written into the latch (column memory) for reading an image signal to perform testing. Accordingly, the problem is that imaging cannot be performed during testing period. Thus, for instance, in the case of performing a shipment test on the image sensor, separate tests are required for detecting whether a pixel defect exists or not by imaging an object and for a linearity test of the count signal to be supplied to the A/D converter, resulting in an increase in testing time.

There has bee a need for a photoelectric conversion system that can test a count signal to be supplied to an A/D converter while imaging an object.

According to an aspect of the present invention, a photoelectric conversion system comprises: a plurality of pixels arranged in a matrix, each pixel including a photoelectric conversion element: a reference signal generating unit for generating a reference signal of a signal level changing in a monotonous manner with time; a plurality of A/D converters each arranged correspondingly to each of columns of the pixels, to analog-to-convert a signal from the pixel; and a counter configured to perform a count operation according to an output of the reference signal from the reference signal generating unit, and to supply a count signal through a count signal line to the A/D converter, wherein the A/D converter has a comparator configured to compare the signal from the pixel with the reference signal generated by the reference signal generating unit, and a memory unit for storing the count signal from the counter, wherein the photoelectric conversion system further comprises a test circuit connected to the count signal line and provided independently from the A/D converter, and the test circuit is configured to perform testing the counter, based on a matching of an expected value of the count signal with the count signal supplied through the count signal line from the counter.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A first embodiment of the present invention will now be described.

Figure 1:
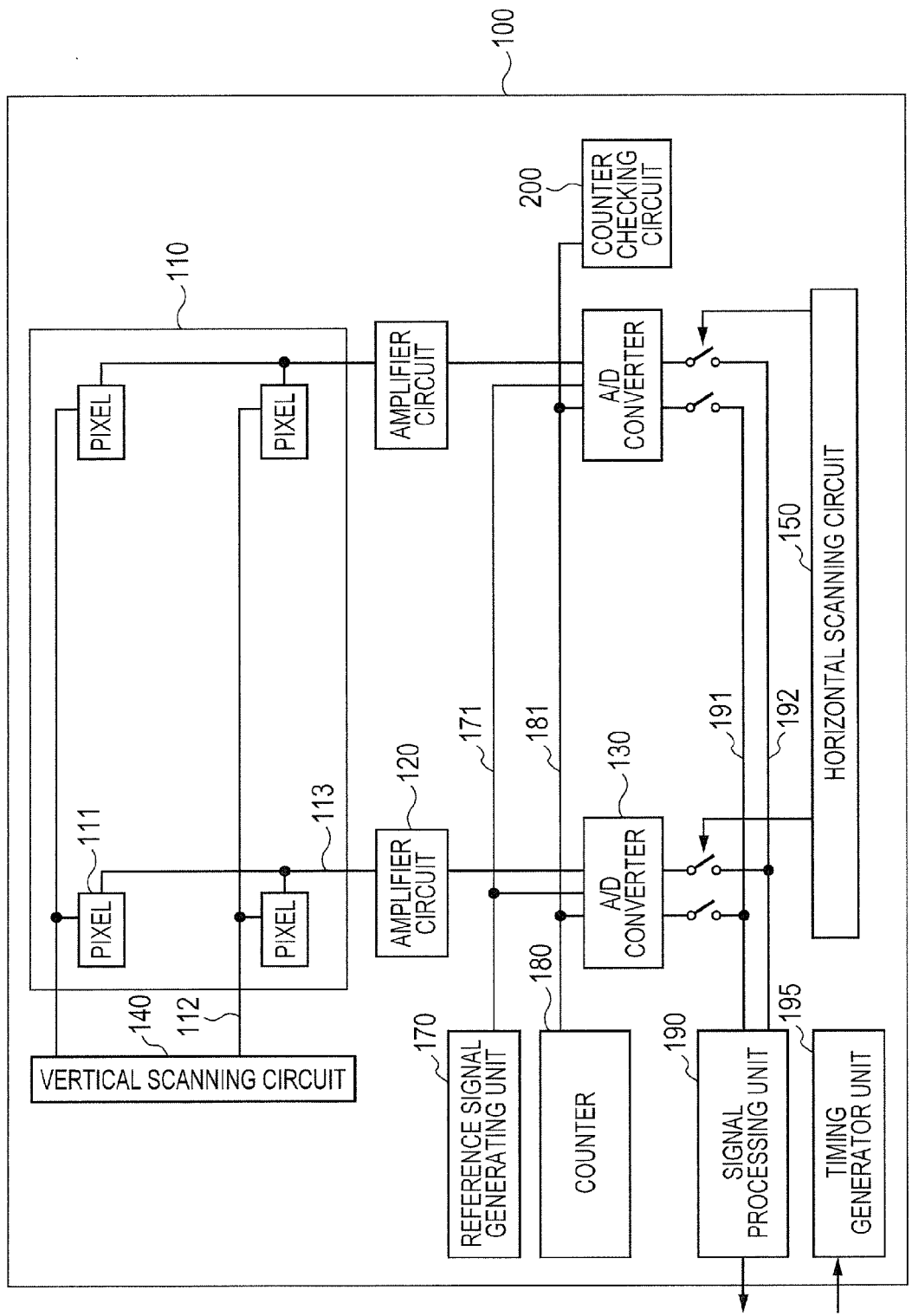
FIG. 1 is a diagram illustrating an example configuration of a photoelectric conversion system according to a first embodiment of the present invention.

FIG. 1 is a block diagram showing an example configuration of a photoelectric conversion system according to the first embodiment. A photoelectric conversion device 100 is, for instance, a CMOS image sensor, and includes the photoelectric conversion system according to this embodiment. The photoelectric conversion device 100 photoelectrically converts incident light representative of an image of an object, and outputs an electric signal acquired by photoelectric conversion, as a digital data, to the outside. The photoelectric conversion device 100 includes a pixel array 110, an amplifier circuit 120, an A/D converter 130, a vertical scanning circuit 140, a horizontal scanning circuit 150, a reference signal generating unit 170, a counter 180, a signal processing unit 190, a timing control unit 195 and a counter test circuit 200.

The pixel array 110 includes a plurality of pixels 111 including photoelectric conversion elements; these pixels are arranged in a matrix (in a row direction and a column direction). For simplicity, FIG. 1 illustrates only four pixels 111. However, the number of pixels 111 is not limited thereto. More pixels are included. In each pixel 111, light incident on the photoelectric conversion device 100 is photoelectrically converted into an analog signal.

The vertical scanning circuit 140 sequentially supplies drive pulse signals to row control lines 112 arranged for the respective pixel rows. After the drive pulse signals are supplied to the row control lines 112, an analog signal is read to the column signal line 113 from the pixel 111 included in the corresponding pixel row. In this embodiment, a noise signal, which is a reset level signal of the pixel 111, and a pixel signal, which is a signal depending on a charge generated by photoelectric conversion with the noise signal superimposed thereon, are read as the analog signal from the pixel array 110. A value acquired by subtracting the noise signal from the pixel signal represents a valid pixel value.

The amplifier circuit 120 and the A/D converter (analog-to-digital converter) 130 are associated with each column of the pixel array 110 and provided for each of column signal lines 113. The amplifier circuit 120 amplifies the analog signal input from the pixel 111 through the column signal line 113, and supplies the signal to the A/D converter 130. The A/D converter 130 performs analog-to-digital conversion (A/D conversion) on the input analog signal to output a digital data.

The reference signal generating unit 170 generates a ramp signal, which is a reference signal, and supplies the generated ramp signal to each A/D converter 130 through a ramp signal line 171. Here, the ramp signal is a signal of a signal level (signal intensity) changing in a monotonous manner with time, and, for instance, a signal whose output voltage monotonously increases or decreases with time. The counter 180 performs a count operation according to an output of the ramp signal from the reference signal generating unit 170, and supplies a count signal, which represents the value of counting, through the count signal line 181 to each A/D converter 130. Any counter 180 may be adopted. For instance, one of a Gray counter and a binary counter may be adopted. The counter 180 may have an increment and decrement function. This embodiment describes the example where the A/D converters 130 share the reference signal generating unit 170 and the counter 180. However, these components may be provided for each A/D converter 130.

The horizontal scanning circuit 150 transfers, to digital signal lines 191 and 192, the digital data output from the A/D converter 130, in a column wise manner. The digital data transferred to the digital signal lines 191 and 192 are supplied to the signal processing unit 190. In this embodiment, the digital data representative of a noise signal and the digital data representative of a pixel signal are sequentially read into the digital signal lines 191 and 192. The signal processing unit 190 subtracts the digital data representative of the noise signal from the digital data representative of the pixel signal and outputs a valid pixel value to the outside.

The timing control unit 195 controls the operation of the photoelectric conversion device 100 by supplying a control signal to each of the components. FIG. 1 does not illustrate a signal line for transmitting the control signal from the timing control unit 195 to each component. The counter test circuit 200 is provided independently from the A/D converter 130, supplied with a count signal through the count signal line 181 from the counter 180 and checks the output of the counter 180 based on the supplied count signal.

In this embodiment, the photoelectric conversion device 100 can include the amplifier circuit 120 to reduce adverse effects of noise occurring in the A/D converter 130. Instead, the photoelectric conversion device 100 may exclude the amplifier circuit 120, and the analog signal from the pixel 111 may directly supplied to the A/D converter 130 through the column signal line 113. In the example shown in FIG. 1, the amplifier circuit 120, the A/D converter 130 and the horizontal scanning circuit 150 are arranged on one side of the pixel array 110. Instead, these components may be arranged on both sides of the pixel array 110, and may be allocated to components either one of the sides for each pixel column.

Figure 2:
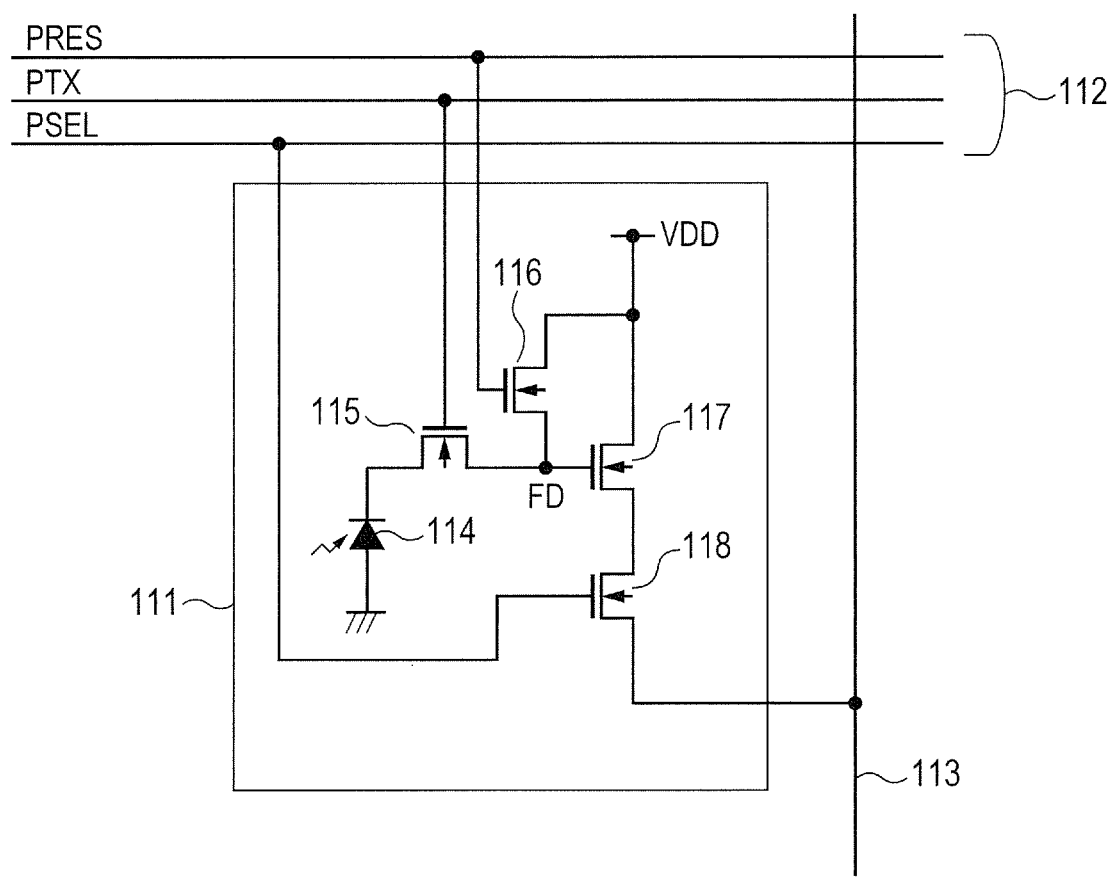
FIG. 2 is a diagram illustrating an example configuration of a pixel according to the embodiment of the present invention.

FIG. 2 is a diagram illustrating an example configuration of the pixel 111. The pixel 111 may have any configuration only if the pixel can supply the A/D converter 130 with an analog signal for calculating the pixel value. The pixel 111 includes a photoelectric conversion element (photodiode) 114 for photoelectric conversion and a plurality of transistors 115, 116, 117 and 118. The photoelectric conversion element 114 is connected to a floating diffusion section FD through a transfer switch 115. The floating diffusion section FD is further connected to the voltage source VDD through the reset switch 116 and also to the gate electrode of the amplifier transistor 117. The amplifier transistor 117 includes a first main electrode connected to the voltage source VDD, and a second main electrode connected to the column signal line 113 through the row selecting switch 118. The gate electrode of the row selecting switch 118 is connected to a row selecting line PSEL, which is one of the row control lines 112. The gate electrode of the reset switch 116 is connected to a reset line PRES, which is one of the row control lines 112. The gate electrode of the transfer switch 115 is connected to a transfer line PTX, which is one of the row control lines.

Figure 3:
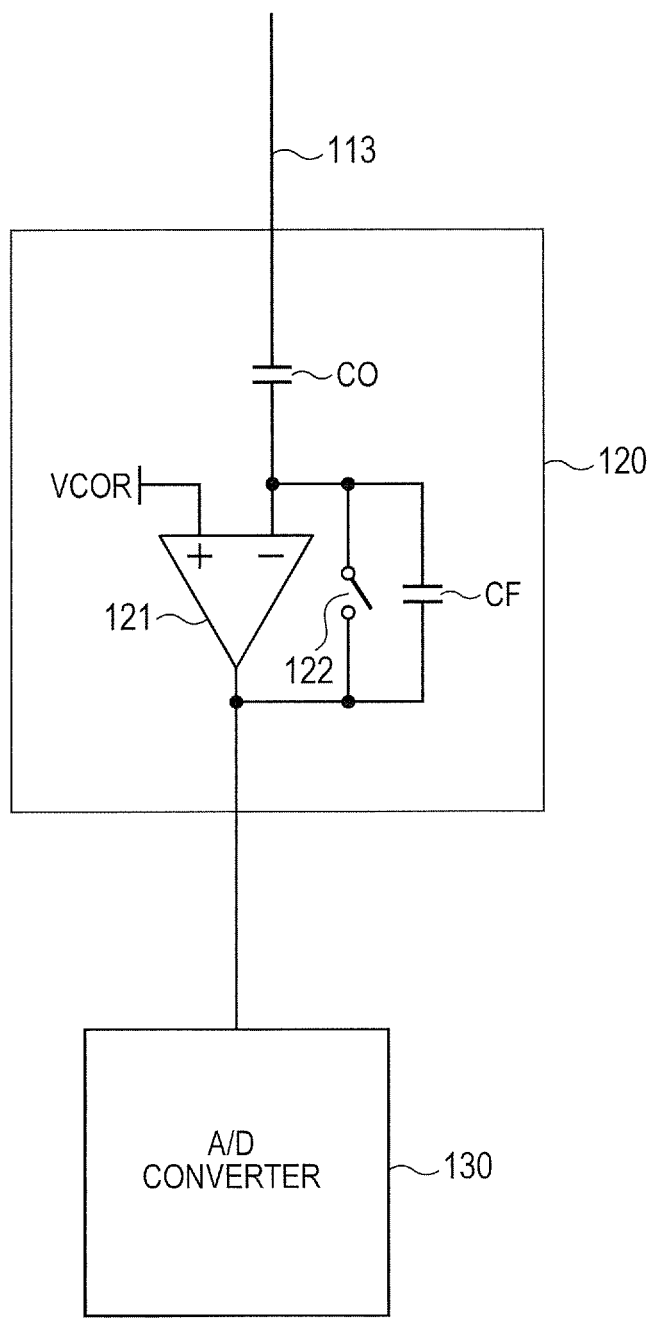
FIG. 3 is a diagram illustrating an example configuration of an amplifier circuit according to the present invention.

FIG. 3 is a diagram illustrating an example configuration of the amplifier circuit 120. The amplifier circuit 120 may have any configuration only if the amplifier can supply the A/D converter 130 with an analog signal for calculating the pixel value of the pixel 111. The amplifier circuit 120 is, for instance, an inverting amplifier illustrated in FIG. 3. The inverting input terminal of the amplifier 121 is connected to the column signal line 113 through a clamp capacitor C0. The non-inverting input terminal of the amplifier 121 is supplied with a voltage VCOR. The output terminal of the amplifier 121 is connected to the A/D converter 130. A feedback capacitor CF and an amplifier reset switch 122 are arranged in parallel between the inverting input terminal and the output terminal of the amplifier 121. The configuration as illustrated in FIG. 3 allows the amplifier circuit 120 to amplify and output a signal input through the column signal line 113 by a factor of a ratio of capacitances of the clamp capacitor C0 and the feedback capacitor CF.

Figure 4:
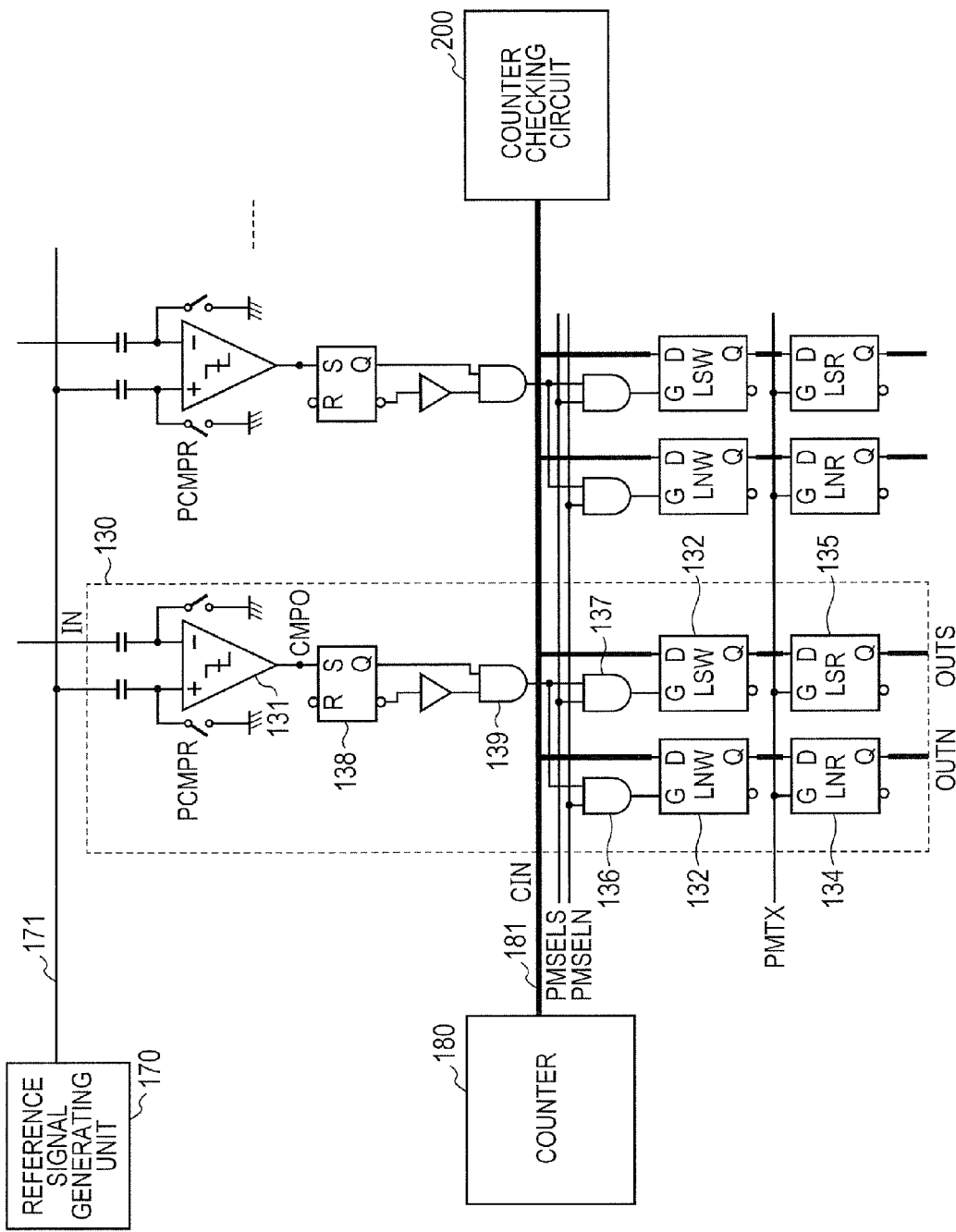
FIG. 4 is a diagram illustrating an example configuration of an A/D converter according to the embodiment of the present invention.

FIG. 4 is a diagram illustrating an example configuration of the A/D converter 130.

Figure 12:
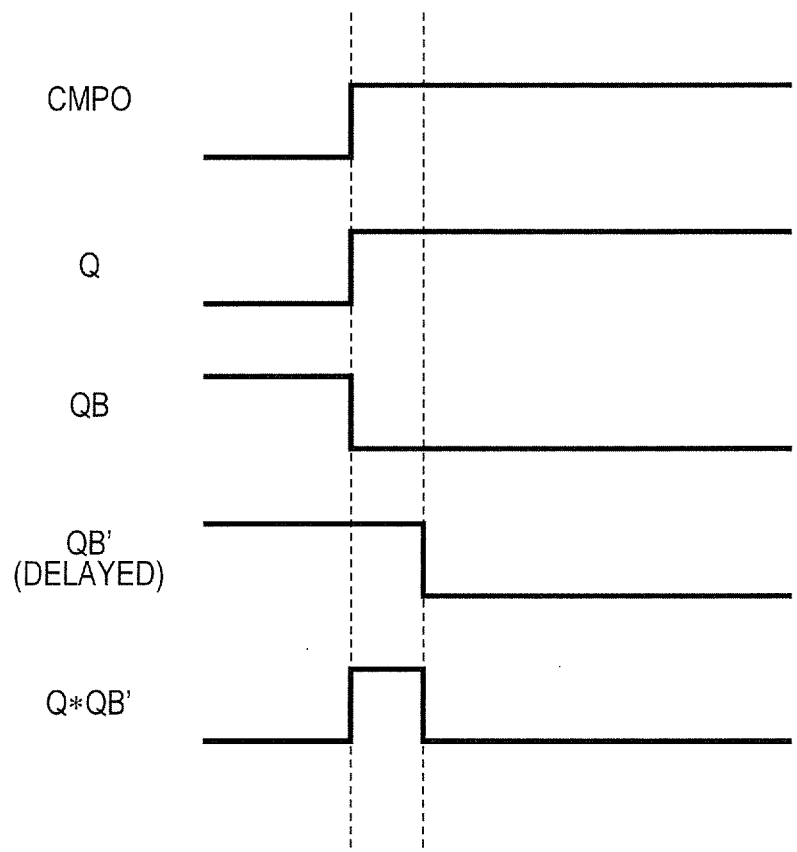
FIG. 12 is a timing chart illustrating latch pulse generation according to the embodiment of the present invention.

An analog signal is input into an input terminal IN through the column signal line 113. A comparator 131 compares the voltage of the analog signal input from the input terminal IN with the voltage of a ramp signal which is a comparison reference and supplied through the ramp signal line 171, and outputs an output signal CMPO having a level according to the result of the comparison. The output signal CMPO of the comparator 131 is input into an S input of an RS flip-flop 138. A Q output of the RS flip-flop 138 and a QB (Q-bar) output of the RS flip-flop 138 having been delayed by a delay generating buffer are input into an AND gate (logical multiplication processing circuit) 139. Thus, the inverting of the QB output of the RS flip-flop 138 to be input into the AND gate 139 is delayed, and the AND gate 139 outputs a narrow width pulse Q*QB' in response to change of an output signal CMPO of the comparator 131 as illustrated in FIG. 12. Latch circuits (LNW, LSW, LNR and LSR) 132, 133, 134 and 135 are memories, and store a digital data in response to the output signal CMPO of the comparator 131. Both the D input of the latch circuit (LNW) 132 and the D input of the latch circuit (LSW) 133 are connected to a count signal line 181. The G input of the latch circuit (LNW) 132 is connected to an output line of an AND gate 136 into which the output of the AND gate 139 and a control signal PMSELN are input. The G input of the latch circuit (LSW) 133 is connected to an output line of an AND gate 137 into which the output of the AND gate 139 and the control signal PMSELS are input. The Q output of the latch circuit (LNW) 132 is connected to the D input of the latch circuit (LNR) 134. The Q output of the latch circuit (LSW) 133 is connected to the D input of the latch circuit (LSR) 135. Both the G input of the latch circuit (LNR) 134 and the G input of the latch circuit (LSR) 135 are connected to a control line PMTX. The Q output of the latch circuit (LNR) 134 is connected to an output terminal OUTN. The Q output of the latch circuit (LSR) 135 is connected to an output terminal OUTS.

Figure 5:
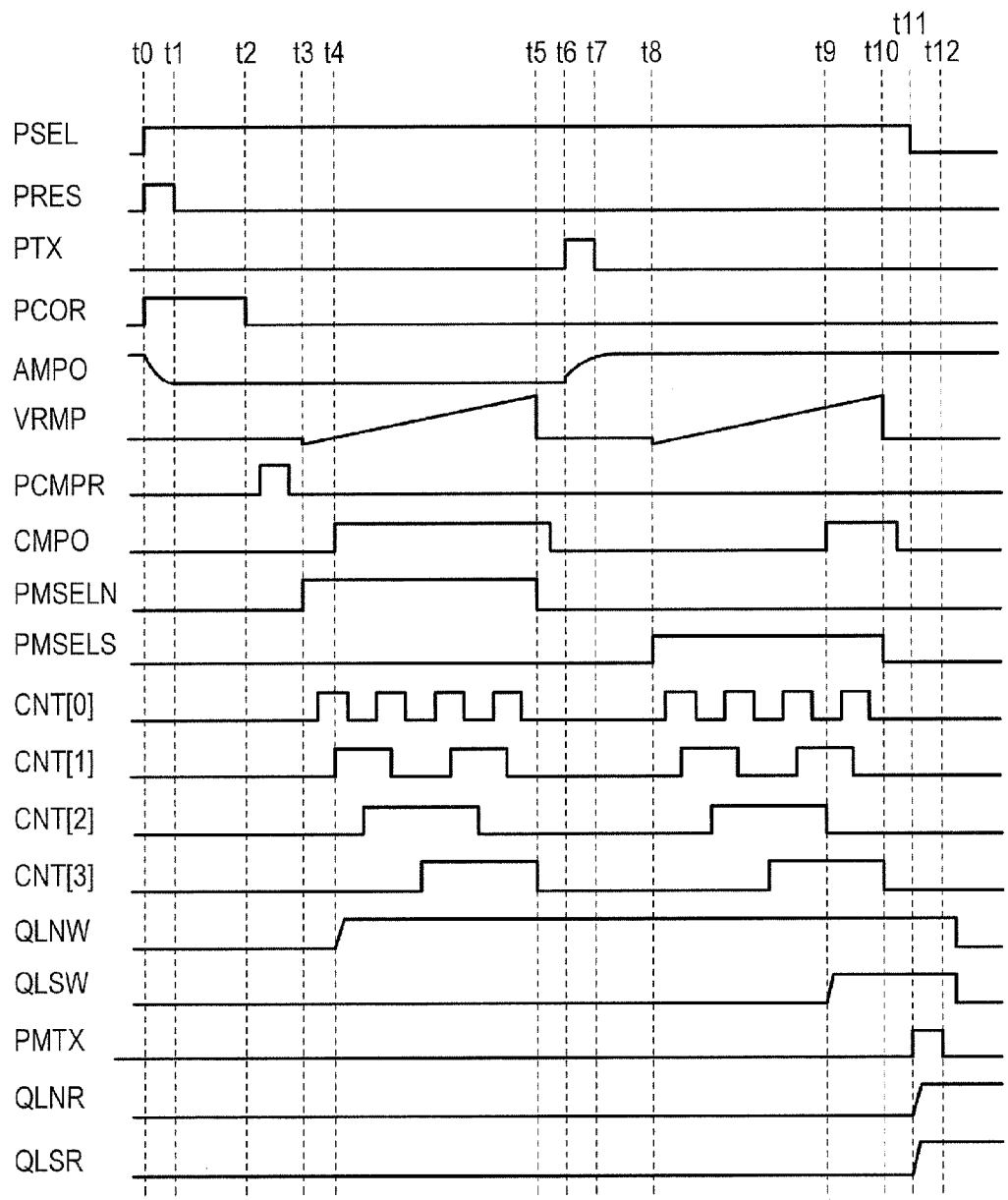
FIG. 5 is a timing chart illustrating a signal waveform according to the embodiment of the present invention.

Next, an operation of the photoelectric conversion system illustrated in FIG. 1 will be described. FIG. 5 is a timing chart illustrating a signal waveform according to the first embodiment. This timing chart illustrates an operation up to the analog signal (photoelectrically converted signal) of the pixels 111 for one pixel row being converted into a digital data by the A/D converter 130. In the following description, the high level of the signal is represented as "H", and the low level of the signal is represented as "L".

First, at time t0, a row selecting pulse PSEL becomes "H" to turn on the row selecting switch 118 (conductive state) and connecting the pixel 111 arranged on any row to the column signal line 113. During a period of time t0 to t1, the pixel reset pulse PRES is "H", and the reset switch 116 resets the floating diffusion section FD of the pixel 111. An output corresponding to the reset state of the pixel 111 (hereinafter called a pixel reset level) is output to the column signal line 113. In a period of time t0 to t2, a reset pulse PCOR is "H" to turn on the amplifier reset switch 122 of the amplifier circuit 120 (conductive state) and clamping the pixel reset level. The output AMPO of the amplifier 121 at this time is hereinafter called an N level.

Subsequently, in a period of time t2 to t5, the A/D converter 130 performs a first A/D conversion process on the N level as an analog input to convert into a corresponding digital data. In time t2 to t3, a comparator reset pulse PCMPR is "H", the N level output from the amplifier 121 and a reference voltage generated by the reference signal generating unit 170 are clamped in input capacitors. The comparator reset pulse PCMPR then becomes "L", and the difference of voltages clamped in the respective input capacitors becomes an initial value of the comparator 131. Subsequently, a ramp signal VRMP from the reference signal generating unit 170 temporarily decreases to a level lower than the reference voltage by a predetermined voltage, and, during time t3 to t5, the voltage (signal level) increases with a constant slope. For instance, at time t4, if the N level matches with the level of the ramp signal VRMP, the output signal CMPO of the comparator 131 changes from "L" to "H".

Meanwhile, the count signal CNT [3:0] supplied from the counter 180 measures a time from time t3, that is, time from starting of output of the ramp signal changing with the constant slope, during time t3 to t5. This embodiment describes the case of using a four-bit Gray counter. However, the configuration is not limited thereto. When the output signal CMPO of the comparator 131 is inverted at time t4 from "L" to "H", the output of the AND gate 136 changes from "L" to "H" and the count signal CNT corresponding to the N level is latched as the digital data by the latch circuit (LNW) 132. At time t5, the first A/D conversion process is finished.

Subsequently, in a period of time t6 to t7, a pixel transfer pulse PTX is "H", and photocharge depending on the amount of incident light is read from the photoelectric conversion element 114 through the transfer switch 115. A level of the pixel reset level on which the photoelectric conversion output is superimposed is read by the column signal line 113. Thus, an output inverted and amplified by the amplifier circuit 120 is input into the A/D converter 130. The output AMPO of the amplifier 121 at this time is hereinafter called an S level.

In a period of time t8 to t10, as with the time t3 to t5, the A/D converter 130 performs a second A/D conversion process of receiving the S level as an analog input and converting the input into a corresponding digital data. For instance, at time t9 in the second A/D conversion process, if the S level matches with the level of the ramp signal VRMP, the output signal CMPO of the comparator 131 changes from "L" to "H". At time t9, when the output signal CMPO of the comparator 131 inverts from "L" to "H", the output of the AND gate 137 changes from "L" to "H" and the count signal CNT corresponding to the S level is latched as the digital data in the latch circuit (LSW) 133. At time t10, the second A/D conversion process is finished.

In a period of time t11 to t12, the memory transfer pulse PMTX becomes "H", the digital data QLNW and QLSW of the latch circuit (LNW) 132 and the latch circuit (LSW) 133 are transferred to the latch circuit (LNR) 134 and latch circuit (LSR) 135, respectively. The digital data QLNR and QLSR for one row stored in the latch circuit (LNR) 134 and the latch circuit (LSR) 135, respectively, are sequentially input by the horizontal scanning circuit 150 into the signal processing unit 190 through the digital signal lines 191 and 192. The signal processing unit 190 performs a process of difference between the digital data corresponding to the N level and the digital data corresponding to the S level, and outputs a processed result as a photoelectric conversion output to the outside of the photoelectric conversion device 100.

Likewise, the next row of the pixel array 110 is selected by the vertical scanning circuit 140, the same reading operation is performed, and scanning of the pixel array is completed one time. A complete image output is thereby output.

Next, the counter test circuit 200 will be described.

Figure 6:
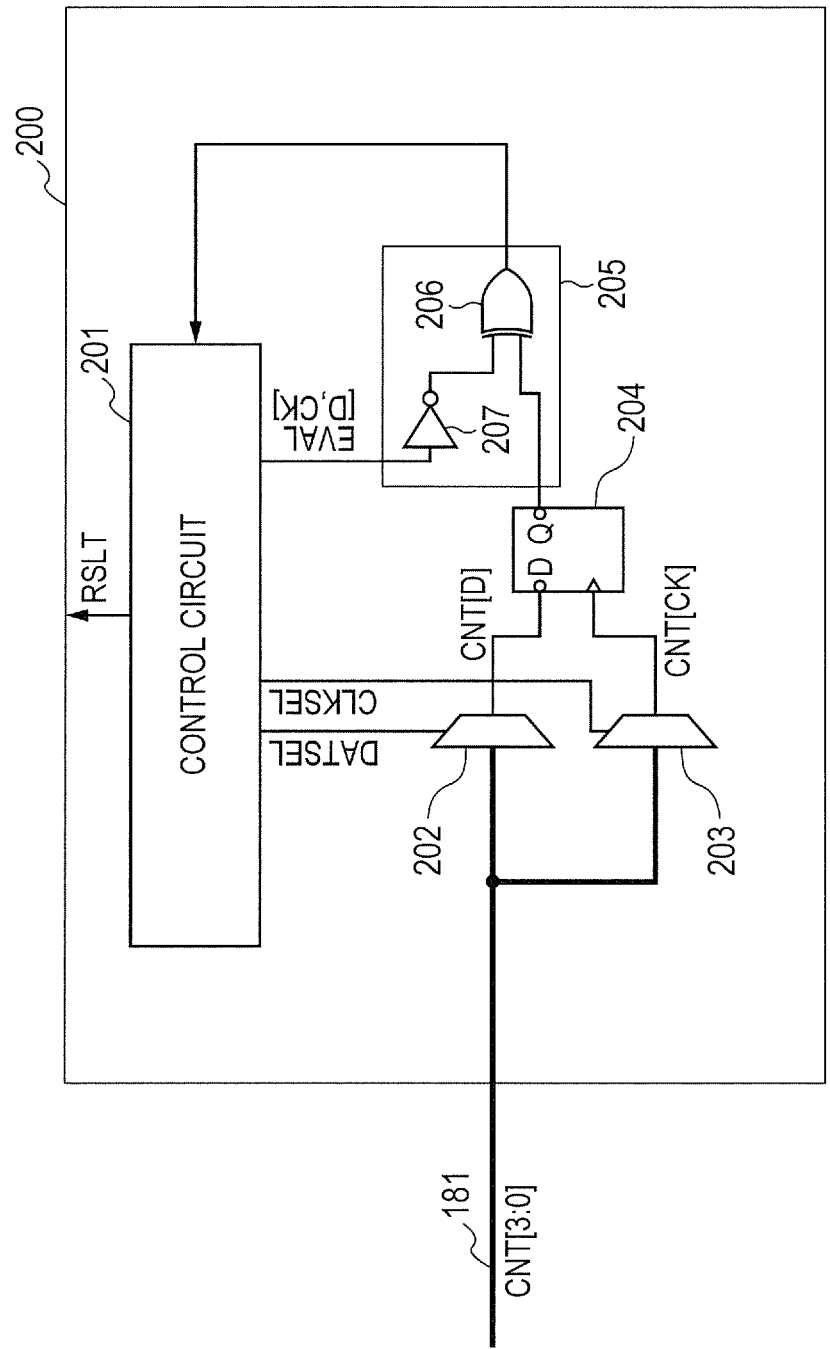
FIG. 6 is a diagram illustrating an example configuration of a counter test circuit according to the present invention.

FIG. 6 is a block diagram showing an example of the configuration of the counter test circuit 200. The counter test circuit 200 includes a control circuit 201, selectors 202 and 203, a testing signal latch 204 and an expected value matching circuit 205.

Figures 7, 8:
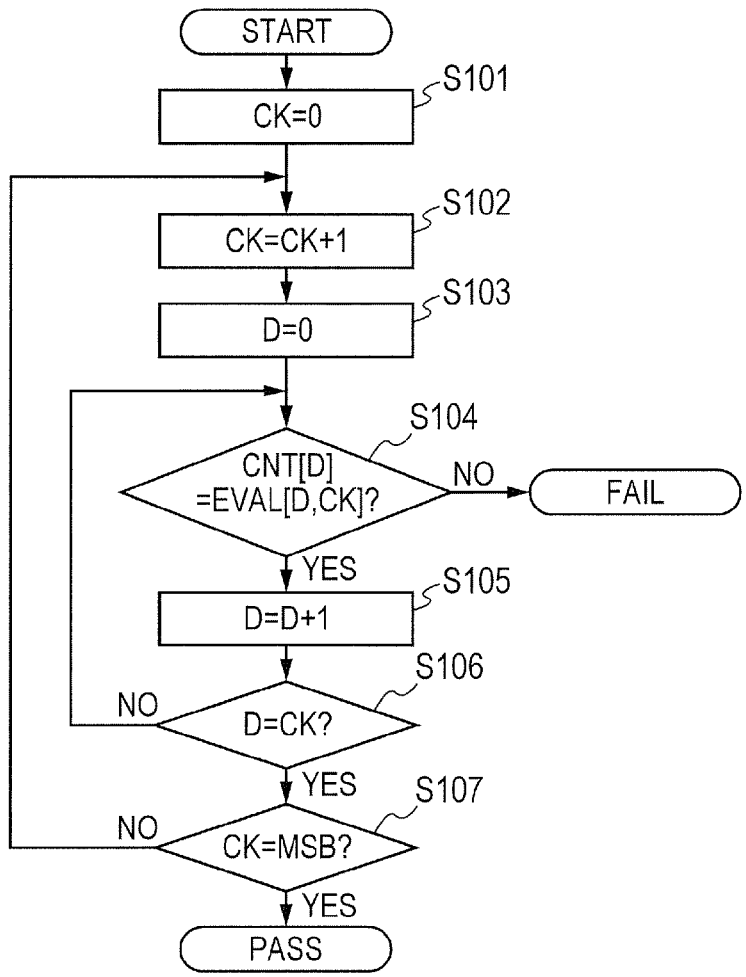
FIG. 7 is a flowchart illustrating an example of an operation of the counter test circuit according to the present invention.
FIG. 8 is a diagram illustrating an example of an expected value of counter testing according to the embodiment of the present invention.

The control circuit 201 outputs a data input selecting signal DATSEL, a clock input selecting signal CLKSEL and an expected value EVAL [D, CK] based on a testing flow illustrated in FIG. 7. The control circuit 201 checks the count signal CNT using a matching result output from the expected value matching circuit 205, and finally outputs a test result RSLT. The test result RSLT is output from the photoelectric conversion device 100, for instance, immediately after the last row of an image data.

The counter test circuit 200 is supplied with the count signal CNT [3:0] through the count signal line 181. The selector 202 selects a data CNT [D] to be input into the data input of the testing signal latch 204, from the count signal, in response to the data input selecting signal DATSEL. The selector 203 selects a data CNT [CK] to be input into the clock input of the testing signal latch 204, from the count signal, in response to the clock input selecting signal CLKSEL. The testing signal latch 204 operates regarding the data CNT [CK] as a clock, and latches the data CNT [D] at a predetermined timing. The output of the testing signal latch 204 is input into the expected value matching circuit 205, and matched with an expected value EVAL [D, CK] supplied from the control circuit 201.

The expected value matching circuit 205 includes an XOR circuit (exclusive OR processing circuit) 206 and an inverter 207. The XOR circuit 206 receives the output of the testing signal latch 204 while receiving the expected value EVAL [D, CK] from the control circuit 201 through the inverter 207. The output of the XOR circuit 206 is output as a matching result. More specifically, if the testing signal matches with the expected value, the expected value matching circuit 205 outputs "H" as the matching result; if the signal does not match with the value, this circuit outputs "L" as the matching result and returns the value to the control circuit 201.

Next, an operation of the counter test circuit 200 will be described.

FIG. 7 is a flowchart illustrating an example of an operation of the counter test circuit 200. In the example of this embodiment, the counter 180 is a four-bit Gray counter. Accordingly, in FIG. 7, an algorithm is adopted in which an expected value of lower bits on a leading edge of bits of the Gray counter is matched with an actual value. The variable D represents bits of the count signal CNT selected as the data CNT [D] by the selector 202 in response to the data input selecting signal DATSEL. The variable CK represents bits of the count signal CNT selected as the data CNT [CK] by the selector 203 in response to the clock input selecting signal CLKSEL.

The control circuit 201 sets the value of the variable CK to zero (step S101). Next, the control circuit 201 increments the value of the variable CK by one (step S102), and sets the value of the variable D to zero (step S103).

Next, on the leading of the count signal CNT [CK], the count signal CNT [D] is latched by the testing signal latch 204, and the count signal CNT [D] is input into the expected value matching circuit 205. The expected value EVAL [D, CK] is output from the control circuit 201, and input into the expected value matching circuit 205. If the count signal CNT [D] matches with the expected value EVAL [D, CK], the expected value matching circuit 205 outputs "H" as the matching result. If the signal does not match with the value, this circuit outputs "L" as the matching result.

The control circuit 201 determines whether the count signal CNT [D] matches with the expected value EVAL [D, CK] or not based on the matching result output from the expected value matching circuit 205 (step S104). If it is determined that the count signal CNT [D] does not match with the expected value EVAL [D, CK] as a result of the determination, the processing is finished as FAIL (failure). In contrast, if it is determined that the count signal CNT [D] matches with the expected value EVAL [D, CK] as a result of the determination, the control circuit 201 increments the value of the variable D by one (step S105). Until the value of the variable D reaches the value of the variable CK, the processes in the steps S104 and S105 are repeated (NO in step S106).

If the value of the variable D reaches the value of the variable CK (YES in step S106), the control circuit 201 determines whether the value of the variable CK reaches the number of bits of the count signal CNT or not (step S107). If the value of the variable CK reaches the number of bits of the count signal CNT as a result of the determination, it is finished as PASS (normal). If not, the processing returns to step S102 and the processes in the steps S102 to S107 are performed.

According to the operation described above, the counter test circuit 200 checks the count signal CNT [3:0] from the counter 180, based on the expected value table illustrated in FIG. 8. For instance, the counter test circuit 200 matches the data of the count signal CNT [0] on the leading edge of the count signal CNT[1] with the expected value EVAL [0, 1], thereby verifying that the lower two bits are normal. Next, the counter test circuit 200 matches the data of the count signals CNT [1] and CNT [0] on the leading edge of the count signal CNT [2] with the expected values EVAL [1, 2] and EVAL [0, 2], respectively, thereby verifying that the lower three bits are normal. Furthermore, the counter test circuit 200 matches the data of the count signals CNT [2], CNT [1] and CNT [0] on the leading edge of the count signal CNT [3] with the expected values EVAL [2, 3], EVAL [1, 3] and EVAL [0, 3], respectively, thereby finally verifying the four bits of the count signal are normal.

The counter test circuit 200 matches the count signal CNT with the expected value EVAL concurrently with the second A/D conversion process. In the example illustrated in FIG. 7, the total of six matching is performed. Accordingly, in the period of A/D conversion for six rows of the pixel array 110, the counter can be tested concurrently with the A/D conversion process.

According to the first embodiment, the counter test circuit 200 is provided independently from the A/D converter 130, thereby allowing the counter 180 to be tested concurrently with the A/D conversion of the signal from the pixel 111. Accordingly, a photoelectric conversion system with a low test cost can be realized without increasing the testing time.

The counter test circuit 200 can be disposed at any position on the count signal line. For instance, in the case of arrangement at a distal end of the count signal line 181 viewed from the counter 180 (a position farther than the A/D converter 130 viewed from the counter 180), the conductivity of the count signal line 181 can also be tested. For instance, in the case where the count signal line is branched into a plurality of lines, the circuit may be arranged at the distal end of each branch. The form of the counter, the resolution of the A/D conversion and the testing flow are only examples. It is apparent that other schemes may be adopted. For instance, the form of the counter may be a binary counter. A testing flow for the counter may be adopted that measures the difference in time of the first leading edges of the respective bits of the count signal and matches the difference with the expected value.

Second Embodiment

Next, a second embodiment of the present invention will be described.

Figure 9:
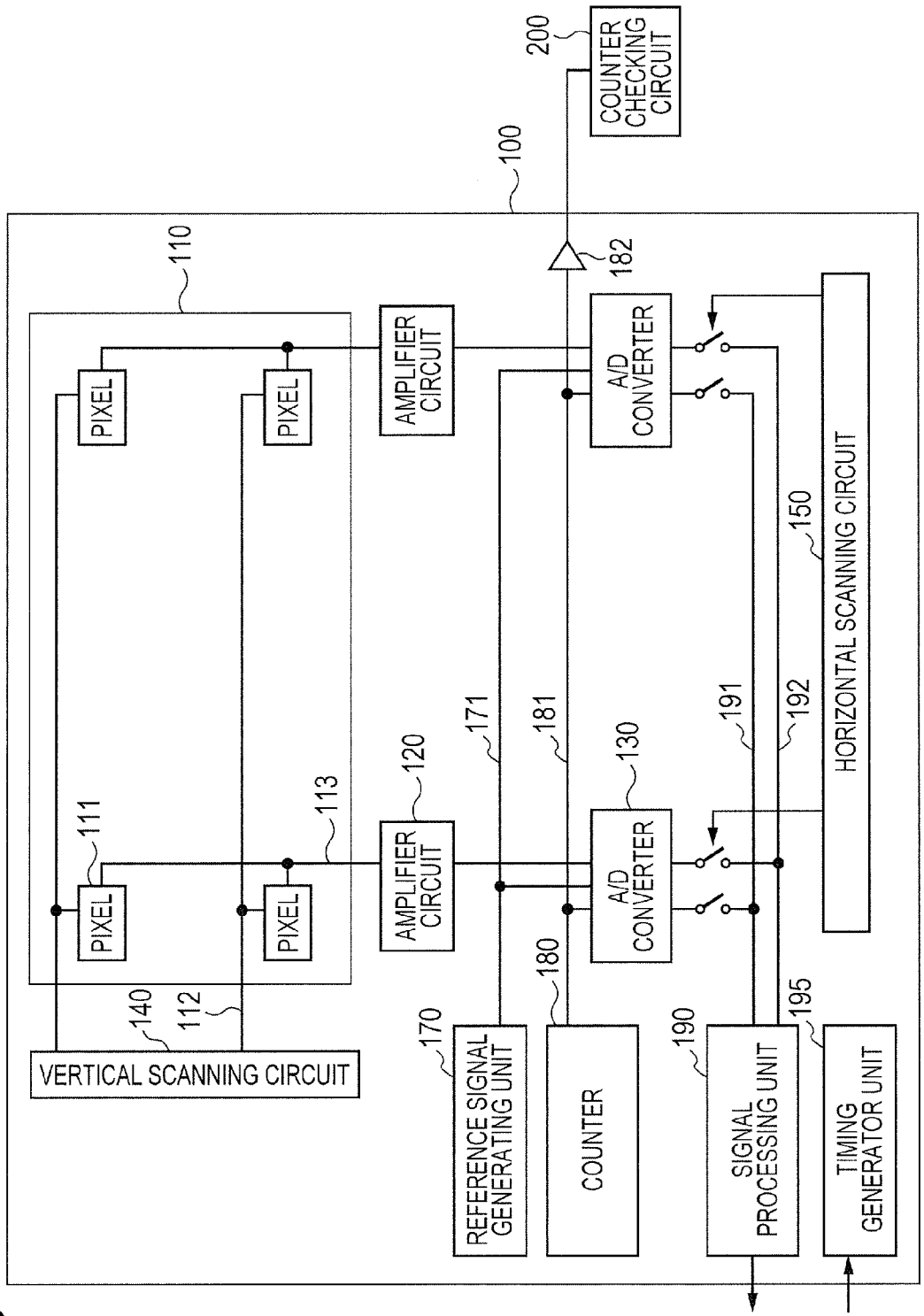
FIG. 9 is a diagram illustrating an example configuration of a photoelectric conversion system according to a second embodiment of the present invention.

FIG. 9 is a block diagram illustrating an example configuration of a photoelectric conversion system according to the second embodiment.

In the first embodiment, the counter test circuit 200 is provided at the inside of the photoelectric conversion device 100. Instead, the photoelectric conversion system according to the second embodiment is provided with the counter test circuit 200 at the outside of the photoelectric conversion device 100. This system is further provided with a buffer circuit 182 that is connected to the count signal line 181 and outputs the count signal to the external counter test circuit 200. The other configuration and operation are analogous to those of the first embodiment. As shown in FIG. 9, the counter test circuit 200 is provided at the outside of the photoelectric conversion device 100. Accordingly, the circuit area of the photoelectric conversion device 100 can be reduced, and a photoelectric conversion system with a low manufacturing cost can be realized.

Third Embodiment

Next, a third embodiment of the present invention will be described.

Figure 10:
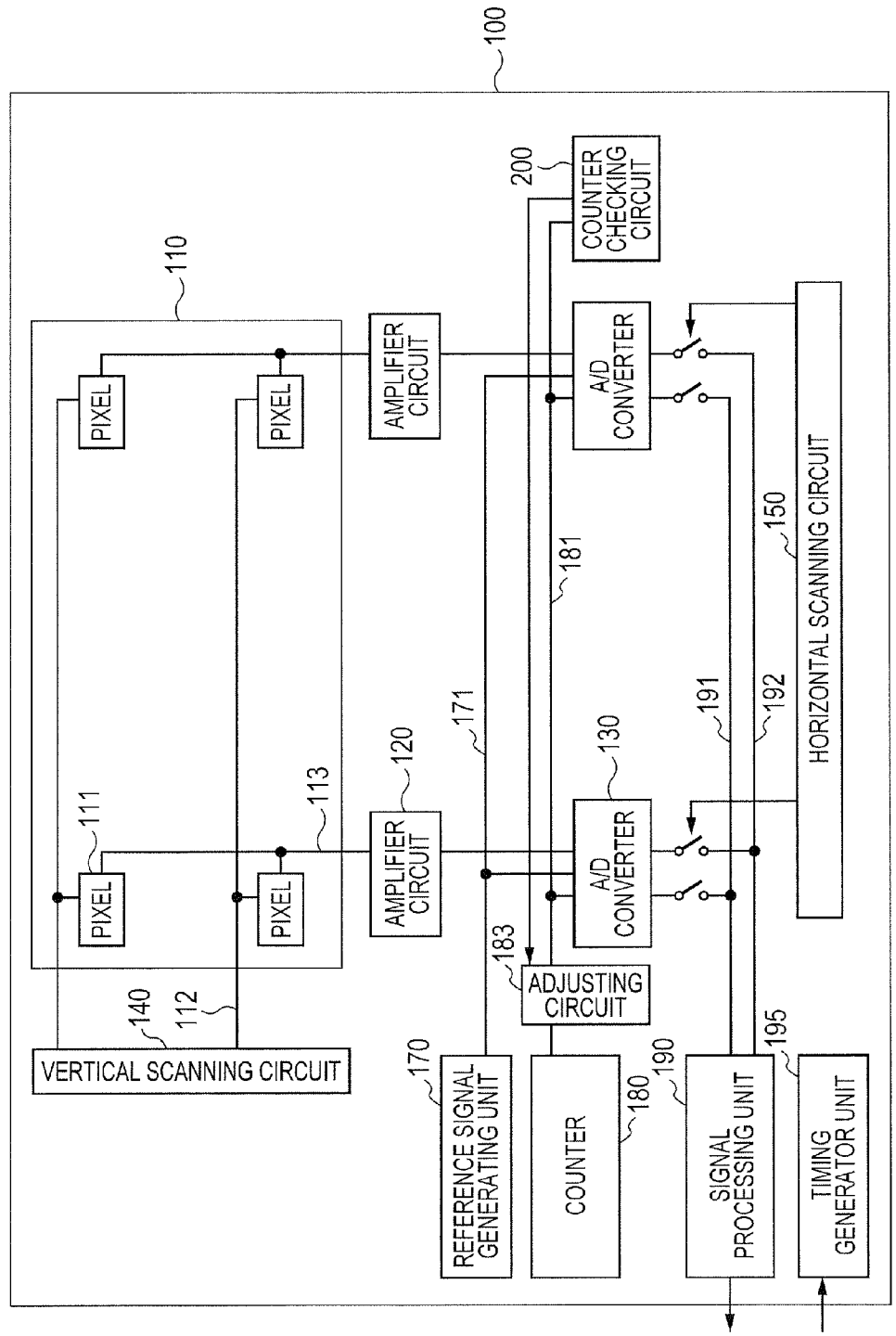
FIG. 10 is a diagram illustrating an example configuration of a photoelectric conversion system according to a third embodiment of the present invention.

FIG. 10 is a block diagram illustrating an example configuration of the photoelectric conversion system according to the third embodiment. The photoelectric conversion system according to the third embodiment includes an adjusting circuit 183 provided between the counter 180 and the count signal line 181. The adjusting circuit 183 controls the delay quantity of the count signal CNT bit by bit, based on the control signal from the counter test circuit 200.

Figure 11:
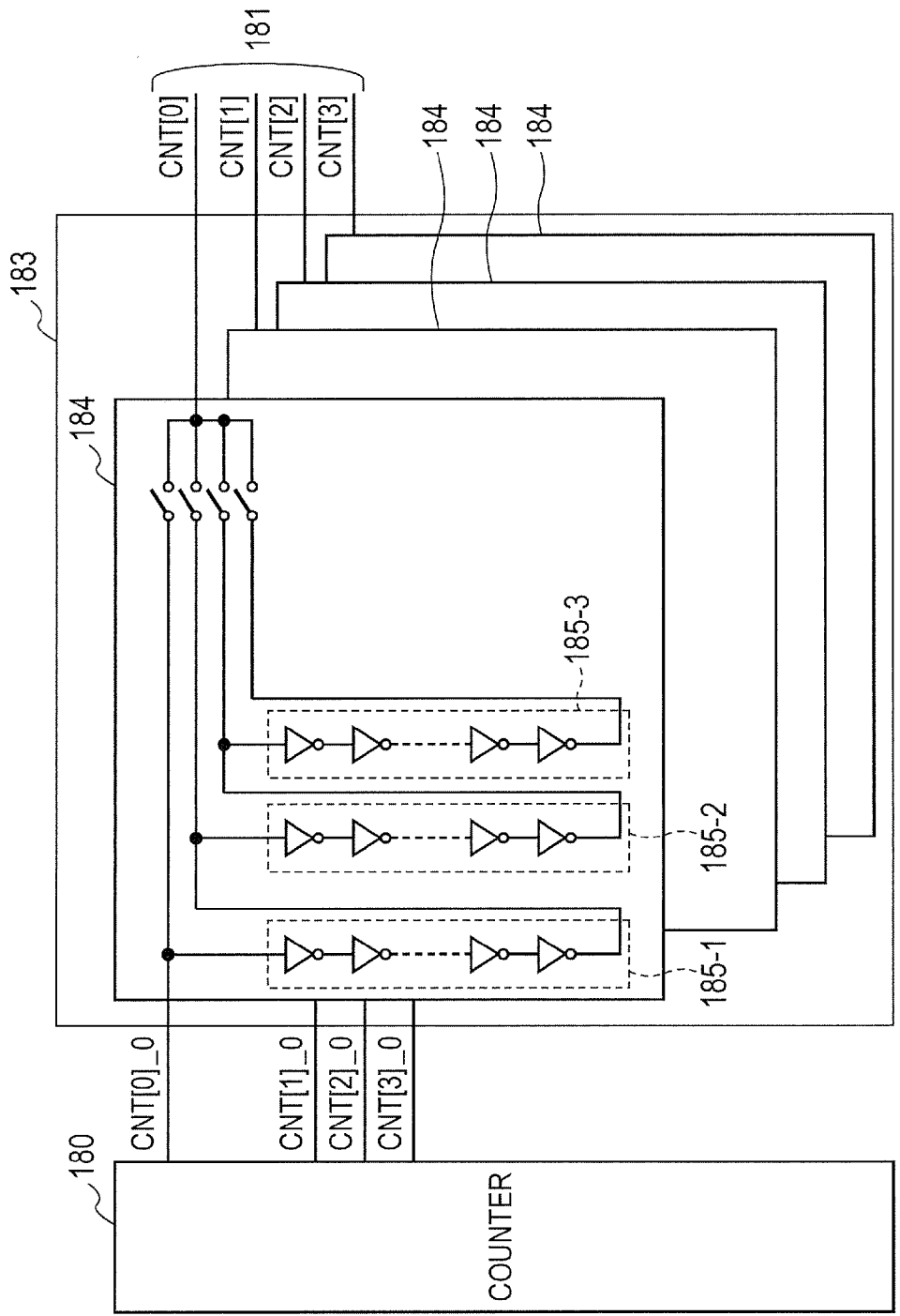
FIG. 11 is a diagram illustrating an example configuration of an adjusting circuit according to the third embodiment of the present invention.

FIG. 11 is a diagram illustrating an example configuration of the adjusting circuit 183. The adjusting circuit 183 includes delay control units 184 corresponding to the respective bits of the count signal CNT. The delay control units 184 receive the count signal CNT [3:0]_O output from the counter 180, and the count signal CNT [3:0]_O is delayed by delay circuits 185-1, 185-2 and 185-3. The delay control units 184 select a signal from one of the input count signal CNT [3:0]_O and the count signal CNT [3:0]_O delayed by the delay circuit 185, and output the signal as the count signal CNT [3:0] to the count signal line 181.

According to the third embodiment, the adjusting circuit 183 is provided, thereby allowing the delay quantity of the count signal CNT to be controlled bit by bit. For instance, if the phase relationship between any bits in the count signal CNT output from the counter 180 is deviated, the deviation of phase can be corrected according to the determination by the counter test circuit 200. For instance, the count signal is appropriately tested and corrected by the counter test circuit 200 in response to change in imaging environment, such as temperature. Accordingly, the photoelectric conversion system excellent in resistance to environment can be realized.

The embodiments have only described the examples of specific implementation of the present invention. The technical scope of the present invention should not be construed in a limited manner. That is, the present invention can be implemented in various forms without departing from the technical spirit or main characteristics thereof.

The photoelectric conversion system according to the present invention is applicable to, for instance, a scanner, a video camera and a digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-223330, filed Oct. 7, 2011, which is hereby incorporated by reference herein in its entirety.

What is claimed is:

1. A photoelectric conversion system comprising:
   a plurality of pixels arranged in a matrix, each pixel including a photoelectric conversion element;
   a reference signal generating unit configured to generate a reference signal of a signal level changing in a monotonous manner with time;
   a plurality of A/D converters each arranged correspondingly to each column of the matrix of pixels, to convert analog signals from the plurality of pixels; and
   a counter configured to perform a count operation according to an output of the reference signal from the reference signal generating unit, and to supply a count signal through a count signal line to the plurality of A/D converters, wherein
   each of the A/D converters has
   a comparator configured to compare a signal from a pixel of the plurality of pixels with the reference signal generated by the reference signal generating unit, and
   a memory unit for storing the count signal from the counter, wherein
   the photoelectric conversion system further comprises
   a test circuit connected to the count signal line and provided independently from the plurality of A/D converters, and the test circuit is configured to test the counter, based on a matching of an expected value of the count signal with the count signal supplied through the count signal line from the counter.

2. The photoelectric conversion system according to claim 1, wherein
   the test circuit derives at a predetermined timing the count signal supplied from the counter, and performs the matching of the expected value with the count signal derived.

3. The photoelectric conversion system according to claim 1, wherein
   the test circuit derives the count signal at a timing of changing a predetermined bit of the count signal supplied from the counter.

4. The photoelectric conversion system according to claim 1, wherein
   the test circuit is arranged at a position on the count signal line distantly from the counter rather than a position of the A/D converter.

5. The photoelectric conversion system according to claim 1, wherein
   the count signal is branched into a plurality of lines, each of which corresponds to the test circuit.

6. The photoelectric conversion system according to claim 1, further comprising
   an adjusting circuit arranged between the counter and the count signal line, to control a delay quantity of the count signal bit by bit.

7. The photoelectric conversion system according to claim 1, wherein
   the testing circuit is arranged at an outside of a photoelectric conversion unit, the photoelectric conversion unit including the plurality of pixels, the reference signal generating unit, the A/D converter and the counter.

8. The photoelectric conversion system according to claim 1, wherein
   the testing circuit is arranged at an inside of a photoelectric conversion unit, the photoelectric conversion unit including the plurality of pixels, the reference signal generating unit, the A/D converter and the counter.

9. The photoelectric conversion system according to claim 1, further comprising
   an amplifier circuit arranged correspondingly to each column of the matrix of pixels, to amplify signals from the plurality of pixels and to supply the amplified signals to the plurality of A/D converters.

* * * * *